United States Patent [19]

Marzocchi

[11] 3,888,645

[45] June 10, 1975

[54] TREATMENT OF GLASS FIBERS

[75] Inventor: Alfred Marzocchi, Cumberland, R.I.

[73] Assignee: Owens-Corning Fiberglas Corporation, Toledo, Ohio

[22] Filed: Aug. 2, 1973

[21] Appl. No.: 385,126

[52] U.S. Cl. .................. 65/3; 117/62.2; 117/72; 117/126 GB; 117/126 GE; 117/161 ZB; 117/DIG. 3
[51] Int. Cl. .................. C03c 25/02; B32b 17/04
[58] Field of Search ......... 117/120 GB, 120 GE, 72, 117/101 ZB, 62.2, DIG. 3; 65/3; 260/42.16

[56] References Cited
UNITED STATES PATENTS

| | | | |
|---|---|---|---|
| 2,939,761 | 6/1960 | Stein | 117/126 GB |
| 2,956,613 | 10/1960 | Edelman | 117/126 GE |
| 3,143,405 | 8/1964 | Wong | 117/126 GB |
| 3,242,244 | 3/1966 | Maly | 117/62.2 |
| 3,473,950 | 10/1969 | Wong | 117/66 |
| 3,658,571 | 4/1972 | Marzocchi | 117/126 GB |
| 3,684,470 | 8/1972 | Marzocchi | 117/126 GB |
| 3,728,146 | 4/1973 | Marzocchi | 117/126 GB |

FOREIGN PATENTS OR APPLICATIONS

| | | | |
|---|---|---|---|
| 160,489 | 1/1955 | Australia | 117/126 GE |

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

This invention is addressed to a method for the treatment of glass fibers and to the glass fibers treated thereby, in which glass fibers are coated while in a nascent state with an epichlorohydrin and a polyhydroxylated compound to form a thin sheath of a polyepoxide in situ on the glass fiber surfaces.

11 Claims, 3 Drawing Figures

TREATMENT OF GLASS FIBERS

This invention relates to the treatment of glass fibers, and more particularly to the treatment of glass fibers for use in textiles having a good hand and feel and improved abrasion resistance and in the manufacture of glass fiber reinforced plastics and elastomeric products.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

Glass fibers have been used for many purposes for a number of years. For example, glass fibers are frequently formed into textile products, including woven and non-woven fabrics formed of strands, cords, yarns, threads, etc., generally referred to in the art as bundles. One of the primary difficulties which has been encountered stems from the fact that glass fibers have low abrasion resistance. Thus, as glass fibers are subjected to processing such as weaving, the glass fibers tend to rub each against the other with the result that individual fiber filaments are broken due to mutual abrasion.

It has become standard practice in the processing of glass fibers to coat the glass fibers as they are formed with a size composition which most frequently is formulated to contain a lubricant, a film-forming material and a glass fiber anchoring agent, preferably in the form of an organo silicon compound, to impart to the glass fibers the desired degree of lubricity to provide the necessary protection for the individual glass fibers against destruction through such mutual abrasion without destroying the fibrous characteristics of the filaments. However, the use of multi-component size compositions formulated to contain an anchoring agent is quite expensive, particularly in light of the high cost of the organo silicon compounds.

It is also well known that glass fibers can be employed as reinforcement for thermosetting resins and elastomeric materials in the manufacture of glass fiber reinforced plastics and elastomeric products, respectively. It has been the practice, in order to securely integrate the glass fibers with the resins and elastomeric materials, to treat the glass fibers with a size composition formulated to contain an organo silicon compound anchoring agent. It is generally believed that the anchoring agent becomes chemically bonded to the glass through a siloxane (—Si—O—Si—) bond, leaving the organic group attached to the silicon atom free for reaction with the resinous or elastomeric components of the continuous phase of the reinforced product to thereby anchor the resinous or elastomeric components to the glass surfaces.

One application of this concept is described in U.S. Pat. No. 3,473,950, in which glass fibers are treated with a solvent solution of (1) an organo silicon compound in which the organic group is substituted by an oxirane ring or a curing agent for an epoxy resin and (2) a reactive epoxy resin. While the procedure described in the foregoing patent is effective in promoting a strong bonding relationship with epoxy resins, it nevertheless relies upon the use of the relatively expensive organo silicon compounds to achieve the desired bonding.

It is accordingly an object of the invention to provide a method for the treatment of glass fibers to improve the bonding relationship between glass fibers and resinous plastics or elastomeric materials in the manufacture of glass fiber reinforced plastics and elastomeric products, respectively, in which the use of organo silicon compounds can be completely avoided.

It is a more specific object of the invention to provide a method for the treatment of glass fibers for use as reinforcement for resins and elastomeric materials wherein a sheath of a polyepoxide is formed in situ, preferably as the glass fibers are still in a nascent state, without the use of an organo silicon compound, whereby the sheath of the polyepoxide is capable of intertying the glass fibers with resins and elastomeric materials.

These and other objects and advantages of the invention will appear more fully hereinafter and, for purposes of illustration and not of limitation, embodiments of the invention are shown in the accompanying drawing in which.

Figure 1:
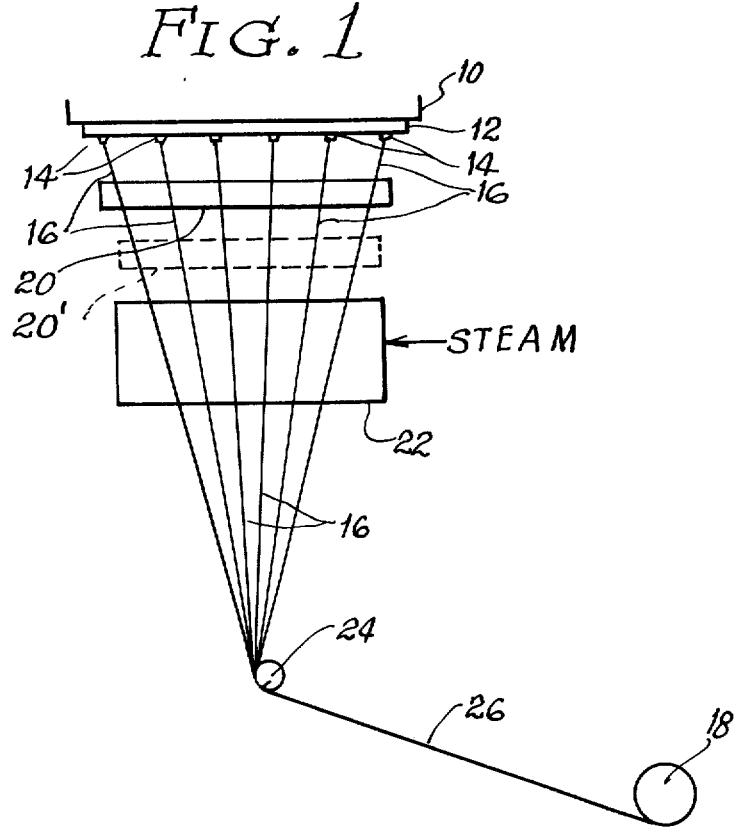
FIG. 1 is a schematic flow diagram illustrating the treatment of glass fibers in accordance with the preferred practice of this invention.

The concepts of the present invention reside in a process for the treatment of glass fibers for use as reinforcement for resins and elastomeric materials in which glass fibers, preferably in a nascent state, are treated with the precursors for a polyepoxide resin and are subsequently treated with heat and/or a cross-linking agent to form the polyepoxide in situ as a sheath on the glass fiber surfaces. The resulting sheath or coating on the individual glass fiber surfaces is rapidly rendered nontacking to permit the treated glass fibers to be wound on a spool or the like without seizure or adherence of the fibers each to the other. The coating is also reactive with resins and elastomeric components to thereby intertie the treated glass fibers with the resin or elastomeric material.

In accordance with the preferred practice of the invention, the glass fibers are treated with an epihalohydrin and a polyhydroxylated compound in the form of a polyhydric phenol such as bis(4-hydroxyphenyl)-2,2-propane, resorcinol, hydroquinone, etc., or a polyhydroxy alcohol such as alkylene glycols containing 2 to 6 carbon atoms, polyalkylene glycols derived therefrom, glycerol, etc. In the treatment of the fibers with the polyepoxide precursors as described, the reactive components can be applied separately or as a mixture. In either case, the epichlorohydrin and the polyhydroxylated compound react in situ on the glass fiber surface to form the sheath of the polyepoxide. It is believed that the alkaline oxides forming the glass serve as a basic catalyst to promote the surface reaction. The resulting polyepoxide sheath formed on the glass surfaces is a polyepoxide having terminal epoxy groups.

For example, the reaction of epichlorohydrin with bis-(y-hydroxyphenyl)-2,2-propane, i.e., bisphenol A, forms the following polyepoxide:

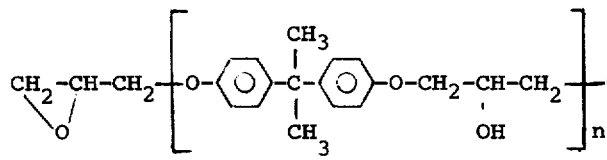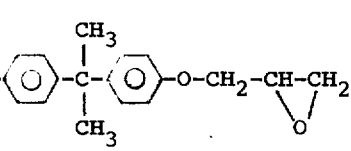

wherein $n$ is a function of the molecular weight. The reaction of epichlorohydrin with an alkylene oxide forms the following polyepoxides:

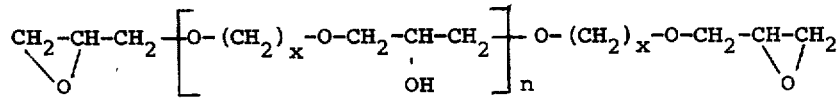

wherein $x$ is an integer corresponding to the number of carbon atoms of the alkylene glycol. Such polyepoxides are themselves well known to those skilled in the art.

After the nascent fibers have been coated with the epihalohydrin and the polyhydroxylated compound, the fibers are immediately passed to a zone maintained at an elevated temperature, preferably at a temperature within the range of 80° to 250°C, and preferably containing a catalyst capable of cross linking or curing the polyepoxide. Such curing agents are themselves well known and are compounds which are capable of reaction with the epoxy groups and/or secondary hydroxy groups in the epoxide molecules. Representative of such well known curing agents are polyamines, such as the alkylene polyamines and polyalkylene polyamines (e.g., ethylene diamine, propylene diamine, butylene diamine, pentylene diamine, diethylene triamine, dibutylene triamine, tripropylene tetramine, tributylene tetramine, tetrapropylene pentamine, etc.), amine-terminated polyamides, low molecular weight urea-formaldehyde and phenol-formaldehyde resins, acid anhydrides (e.g., phthalic anhydride, maleic anhydride, etc.). Preferred are the amine curing agents; as is known to those skilled in the art, nearly any poly-primary or -secondary amine is capable of use as a curing agent.

The residence time in the curing zone is not critical to the practice of the invention. In general, the curing time should be sufficient to promote the reaction between the epichlorohydrin and the polyhydroxylated compound to produce a polyepoxide having an average molecular weight up to about 2,500 and preferably within the range of 500 to 2,000, and to permit the curing of the resulting epoxide when a curing agent is employed. It has been found that best results are usually obtained where the time in the reaction and curing zone ranges from 0.1 to 5 seconds although longer times may be employed, if desired.

It is sometimes desirable to pass hot air along with the curing agent through the curing zone to facilitate removal of any HCl which has been formed by the reaction. Alternatively, it is possible and sometimes desirable to employ ammonia or a related basic gas in the curing zone for the purpose of facilitating removal of HCl formed. For example, ammonia along with the curing agent may be passed through the curing zone whereby HCl liberated reacts with ammonia, forming ammonium chloride which can be removed by filtration or the like, and unreacted ammonia can simply be recycled to the curing zone.

The relative proportions of the reactants are likewise not critical to the practice of the invention. It is preferred that the mole ratio of the epihalohydrin to the hydroxylated compound be within the range of 0.95 to 1.5. It has been found that the amount of curing agent, when use is made of a curing agent, should be limited to prevent complete curing of the polyepoxide and thereby provide in the cured coating a polyepoxide having secondary hydroxy groups and/or terminal epoxy groups available for reaction when the treated glass fibers are combined with resins or elastomeric materials in the manufacture of glass fiber reinforced resinous and elastomeric products. Good results can be obtained where the amount of the curing agent ranges from 0.01 to 0.9 mole per mole of epihalohydrin employed.

It is an important concept of this invention to apply the epihalohydrin and the polyhydroxylated compound to the glass fibers while the glass fibers are in their nascent state. As used herein, the term nascent state is intended to refer to and define glass fibers which have not yet formed a thin moisture film on the surfaces thereof as a result of their hydrophilic surface characteristics. Such a nascent state exists for a very short time after the glass fibers are formed, but is destroyed by the moisture in tha air. Thus, the application of the epihalohydrin and the polyhydroxylated compound is best accomplished by applying these reactive compounds to the glass fibers as they are formed.

It is also important in the practice of the present invention to avoid the use of aqueous media in the treatment of the glass fibers since the water would result in the formation of the tenacious film of moisture on the glass fiber surfaces.

Without limiting the present invention as to theory, it is believed that the application of the precursors of the polyepoxide to the nascent glass fibers results in the establishment of a chemical bond between the nascent glass fiber surfaces which are rich in reactive Si-O-Si groups and the epihalohydrin and/or the polyhydroxylated compound

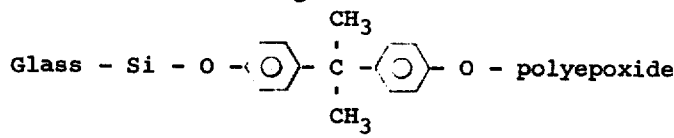

and/or

Glass — Si — O — CH$_2$ — CH$_2$ — CH$_2$ — O — polyepoxide with bisphenol A and epichlorohydrin as illustrated. It is further believed that the sheath or coating of polyepoxide is formed rapidly, to prevent hydrolysis of the Si—O— organic group bonds established through atmospheric moisture.

Having described the basic concepts of the invention, reference is now made to the following specific examples which are provided by way of illustration and not by way of limitation of the practice of the invention in the treatment of glass fibers for use in the manufacture of textiles, glass fiber reinforced resins or glass fiber reinforced elastomeric products.

EXAMPLE 1

This example illustrates the practice of the invention in the treatment of glass fibers as they are formed with an equimolar mixture of epichlorohydrin and propylene glycol.

Referring now to the schematic diagram of FIG. 1, the glass is melted in a glass melting furnace 10 having a bushing 12 on the bottom side. The bushing 12 is formed with a plurality of openings extending therethrough and the molten glass flows gravitationally through the openings to form streams 14 which are rapidly attenuated into fine glass filaments 16 by winding the filaments about a rapidly rotating drum or collet winder 18. The filaments 16 are coated almost immediately as they are formed and, hence, when they are in a nascent state with the mixture of the epichlorohydrin and the propylene glycol by means of an applicator 20 which may be in the form of a roller which is constantly wet with the mixture.

Application of the mixture is made in an amount sufficient to deposit at least a monomolecular layer of the mixture on the glass fiber surface. It is generally preferred to deposit the mixture on the surfaces of the individual glass fiber filaments in an amount constituting from 0.1 to 5 percent by weight based on the weight of the glass fibers.

After the filaments are coated with the mixture, the filaments are preferably passed through a steam chamber to heat the coating on the glass fibers to effect reaction of the epichlorohydrin with the propylene glycol in the nascent glass fiber surfaces. The heating step is effective in the reaction to form the polyepoxide as a sheath on the glass fiber surfaces, with the polyepoxide having terminal, reactive epoxy groups. The heating step is also effective to render the polyepoxide coating on the glass fiber surfaces to a non-tacky state to thereby enable the coated glass fibers to be gathered together by means of a gathering shoe 24 and wound without seizure or adherence between the overlying strands 26.

Figure 2:
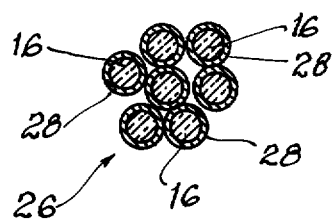
FIG. 2 is a cross sectional view of a strand of glass fibers processed in accordance with the method illustrated in FIG. 1.

The resulting coated glass fibers are shown in FIG. 2 of the drawing. The polyepoxide forms a very thin coating or sheath 28 about the individual glass fiber filaments 16. This sheath 28 serves to impart to the glass fibers the desired lubricity to prevent destruction of the glass fibers through mutual abrasion during subsequent processing without destroying the fibrous characteristics of the glass fibers.

The strands 26 of the coated glass fibers can be plied with other strands and twisted to form yarns, cords or threads which may be used in textile applications or as reinforcement for resinous materials, and particularly thermosetting resins suchh as polyepoxide or polyester resins or as reinforcement for elastomeric materials, either with or without cutting to shorter lengths. The yarns, cords, threads or strands can also be formed into woven or nonwoven fabrics for use in such applications.

EXAMPLE 2

This example illustrates the preferred practice of the invention in the use of a curing agent for the epoxy resin.

Using the procedure described in Example 1, glass fibers are coated as they are formed with a mixture of equal molar amounts of epichlorohydrin and bisphenol A. After the nascent glass fibers are coated with the mixture, the coated fibers are passed through the steam chamber 22 into which there is fed a vaporous mixture of steam and ethylene diamine in which the ethylene diamine is regulated to provide about 1 mole of diamine per mole of epichlorohydrin contained in the coating on the glass fiber surfaces.

The combination of heat and the amine curing agent is effective to promote reaction between the epichlorohydrin and the bisphenol A and to effect cure and/or curing of the epoxide resin forming the sheath of the individual glass fiber filaments.

EXAMPLE 3

This example illustrates the concept of the invention in the application of the reactants sequentially to the glass fiber surfaces.

The procedure and apparatus employed in this example are the same as that described in Example 1 except that the apparatus includes a second applicator means 20' between the applicator 20 and the steam chamber 22 as illustrated in broken lines in FIG. 1. As the glass fibers are formed, the fibers are just coated with bisphenol A by means of the first applicator 20, followed immediately by a second coating of epichlorohydrin by applicator 20'. The applicators are adjusted to provide a slight molar excess of the epichlorohydrin (mole ratio of 1.2 moles of epichlorohydrin per mole of bisphenol A).

The coated fibers are then passed through the steam chamber 22 in which the fibers are contacted with steam and diethylene triamine as a curing agent for the polyepoxide which is formed on the glass fiber surfaces. A thin, tough polyepoxide resin coating is formed on the surfaces of the individual filaments.

In the preferred practice of this invention, the glass fibers treated to form the polyepoxide sheath on the surfaces thereof are advantageously formed into strands, which can be plied with other strands of treated glass fibers and twisted to form yarns, threads or cords for use as reinforcement for elastomeric materials, with or without cutting to shorter lengths. After the treated glass fibers have been formed into strands, yarns, cords or fabrics, generally referred to in the art as bundles, the bundles of glass fibers having the polyepoxide sheath thereon are subjected to impregnation in a conventional manner with an impregnating composition formulated to include a resorcinol-aldehyde resin component and at least one elastomer component. Such impregnating compositions are generally well-known to the art and are described in U.S. Pat. Nos. 3,391,052; 3,402,064; 3,424,608; 3,506,476; 3,533,830; 3,567,671; 3,591,357 as well as others.

Without limiting the invention as to theory, it is believed that the epoxide sheath on the glass fiber surfaces is capable of reaction with free methylol groups contained in the resorcinolaldehyde resin matrix to chemically bond the impregnant to the sheath on the glass fiber surfaces accordingly:

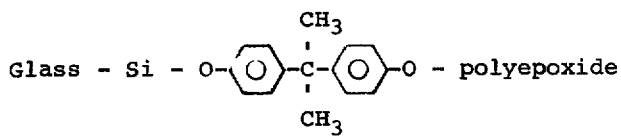 - polyepoxide - 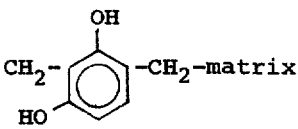-matrix

Figure 3:
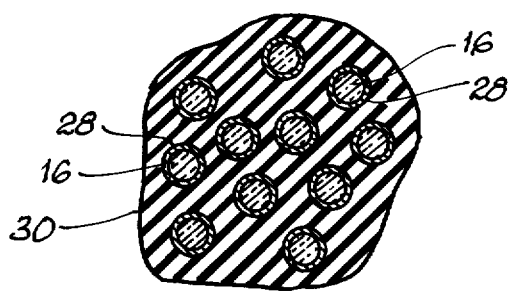
FIG. 3 is a cross sectional view of a bundle of glass fibers in which the glass fibers are first treated in accordance with the method illustrated in FIG. 1 and subsequently formed into bundles which are subjected to impregnation in accordance with another embodiment of the invention.

Impregnation of bundles of glass fibers which have been previously coated to form a sheath of a polyepoxide on the individual glass fibers can be carried out in accordance with the method described in U.S. Pat. No. 3,424,608 in which a bundle of coated fibers is immersed in an aqueous bath of the impregnating composition and subjected to a sharp bend while immersed in the bath to open the bundle and thereby facilitate complete penetration of the bundle by the solids of the impregnating composition. In the resulting bundle, which is illustrated in FIG. 3 of the drawing, the impregnant 30 serves to completely penetrate the bundle to fill the interstices between the coated glass fibers forming the bundle and to separate the coated fibers each from the other. It has been found that impregnated bundles formed in this manner are particularly well suited for use as reinforcement for elastomeric products such as rubber tires, drive belts, timing belts and the like.

The relative proportions of the resorcinol-aldehyde resin and the elastomer contained in the impregnating composition is not critical to the practice of the invention. Most of such compositions contain from 2 to 10 parts by weight of the resin, usually as resorcinol-formaldehyde resin for each 15 to 60 or more parts of the elastomer present in the impregnating composition. The impregnating composition, which usually has a solids content of 10 to 50 percent solids by weight, is applied in an amount sufficient to deposit dry solids constituting from 5 to 25 percent of the glass fiber system.

The preferred practice of the invention in the impregnation of bundles of fibers which have been treated in accordance with the practice of the invention to form a sheath of a polyepoxide may be illustrated by way of the following examples.

EXAMPLE 4

Glass fibers which have been treated in accordance with one of Examples 1 to 3 are formed into bundles and subjected to impregnation with a composition of the type described in U.S. Pat. No. 3,567,671.

|  | Parts by weight |
| --- | --- |
| Resorcinol-formaldehyde resin (Penacolyte R 2170) | 6 |
| Vinyl pyridine-butadiene-styrene terpolymer (Gentac FS) | 30 |
| Vinyl chloride — vinylidene chloride copolymer (Dow Latex 874) | 20 |
| Microcrystalline paraffin wax | 6 |

Impregnation is carried out in accordance with the immersion technique described above, and the resulting impregnated bundle can be combined with elastomeric materials in the manufacture of glass fiber reinforced elastomeric products in which the elastomeric material constituting the continuous phase is securely bonded to the glass fiber surfaces through the sheath of the polyepoxide and the impregnant.

EXAMPLE 5

Using the procedure described in Example 4, a bundle of glass fibers treated in accordance with one of Examples 1 to 3 is subjected to impregnation with the following composition:

|  | Parts by weight |
| --- | --- |
| Resorcinol-formaldehyde resin | 6 |
| Vinyl pyridine-butadiene-styrene terpolymer | 31 |
| Dicarboxylated butadiene-styrene copolymer (Pliolite 4121) | 21 |
| Microcrystalline paraffin wax | 6 |

In fabricating the combinations of glass fibers treated in accordance with the practice of this invention, with elastomeric or resinous materials, the glass fibers or bundles of glass fibers are mixed with the elastomeric or resinous material or otherwise laid down in the desired arrangement for combination with the elastomeric or resinous material, as in the manufacture of glass fiber reinforced belts or in the manufacture of rubber tires reinforced with cords of glass fibers, or in the manufacture of molded plastics. The combinations of glass fibers and elastomeric or resinous materials are then processed in a conventional manner by molding and curing under heat and pressure or by vulcanizing for advancement of the elastomeric materials to a cured or vulcanized state while in combination with the treated glass fibers whereby the glass fibers become strongly integrated with the elastomeric or resinous material in the glass fiber-elastomeric product.

It will be understood that changes may be made in the details of formulation and methods of preparation without departing from the spirit of the invention, especially as defined in the following claims.

I claim:

1. A method for treatment of glass fibers comprising the steps of coating the glass fibers in a nascent state with an epihalohydrin and a polyhydroxylated compound and heating the resulting coated glass fibers to react the epihalohydrin with the polyhydroxylated compound on the glass fiber surfaces to form a thin sheath of a polyepoxide on the surfaces.

2. A method as defined in claim 1 in which the glass fibers are coated with the epihalohydrin and the polyhydroxylated compound simultaneously by coating the glass fibers with a mixture of the epihalohydrin and the polyhydroxylated compound.

3. A method as defined in claim 1 wherein the glass fibers are coated sequentially with the polyhydroxylated compound and the epihalohydrin.

4. A method as defined in claim 1 wherein the resulting coated glass fibers are heated in the presence of a curing agent for the epoxide resin.

5. A method as defined in claim 4 wherein the curing agent is employed in an amount of 0.01 to 0.9 moles of curing agent per mole of the epihalohydrin.

6. A method as defined in claim 1 wherein the epihalohydrin is present in a mole ratio of epihalohydrin to polyhydroxylated compound within the range of 0.95 to 1.5.

7. A method as defined in claim 1 wherein the glass fibers are coated as they are formed.

8. A method as defined in claim 1 wherein the glass fibers are coated in the absence of aqueous medium.

9. A method as defined in claim 1 wherein the polyhydroxylated compound is selected from the group consisting of a polyhydric phenol and a polyhydroxylated aliphatic alcohol.

10. A method as defined in claim 1 wherein the curing agent is selected from the group consisting of polyamines, amine-terminated polyamides, low molecular weight urea-formaldehyde and phenol-formaldehyde resins and acid anhydrides of polycarboxylic acids.

11. A method as defined in claim 1 which includes the step of forming the glass fibers having the thin sheath of the polyepoxide on the surfaces thereof into bundles and impregnating the bundles with a blend of a resorsinolaldehyde resin and an elastomer.

* * * * *